Aug. 30, 1966  H. D. COOK  3,270,189
DEVICE FOR DETERMINING AN ANGLE FROM A SET
OF ORTHOGONAL COMPONENTS
Filed July 7, 1961  3 Sheets-Sheet 1

INVENTOR
Herbert D. Cook
BY
David Robbins
ATTORNEY

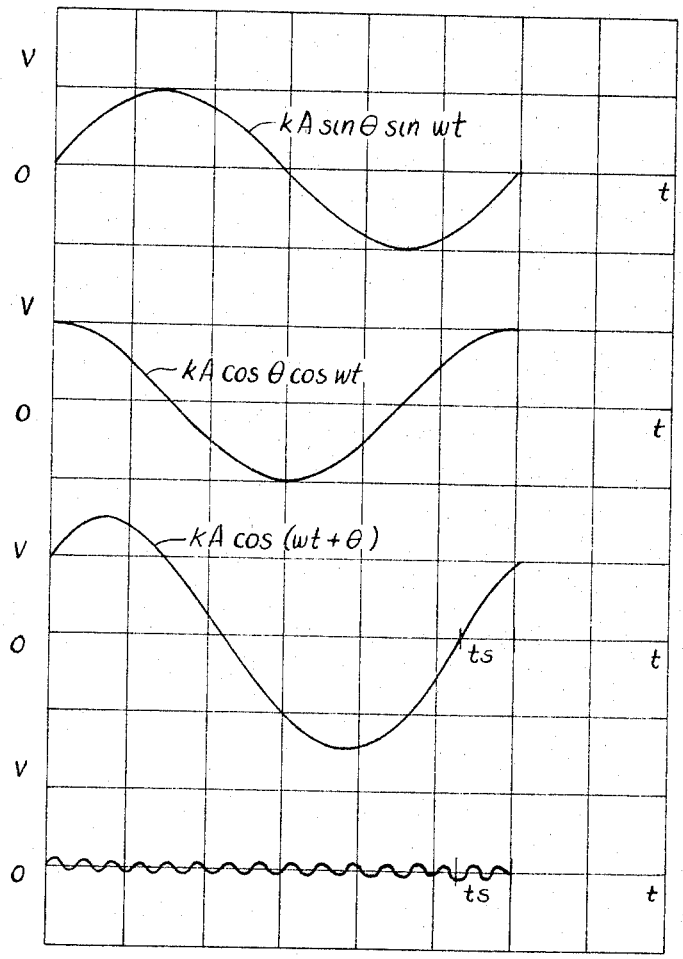

United States Patent Office 3,270,189
Patented August 30, 1966

3,270,189
DEVICE FOR DETERMINING AN ANGLE FROM A SET OF ORTHOGONAL COMPONENTS
Herbert D. Cook, Arlington, Va., assignor to the United States of America as represented by the Secretary of Commerce
Filed July 7, 1961, Ser. No. 122,600
4 Claims. (Cl. 235—189)

This invention relates to an electrical device for indicating the angle of a radius vector when signals dependent upon a set of orthogonal components are applied thereto.

The systems in the prior art, used for measuring the angle of a radius vector when signals dependent upon a set of orthogonal components are known, employ electromechanical devices, such as resolvers or servomechanisms and therefore are relatively slow in making computations.

Accordingly, it is an object of the present invention to provide a device, comprising primarily electrical and electronic components, for rapidly converting signals representing the orthogonal components of a point to a signal representing the angle of a radius vector drawn through the point.

This is accomplished by using a pair of signals having substantially constant magnitudes proportional to the $y$ and $x$ components, to generate a waveform, for example, $kA \cos(\omega t + \theta)$ where $A = \sqrt{x^2 + y^2}$, and $k$ is an arbitrary constant. The phase difference between $kA \cos(\omega t + \theta)$ and $\cos \omega t$ is then measured to determine the value of $\theta$.

In the figures:

FIGS. 3A to 3D are waveforms used in explaining the operation of the invention;

Figure 1:
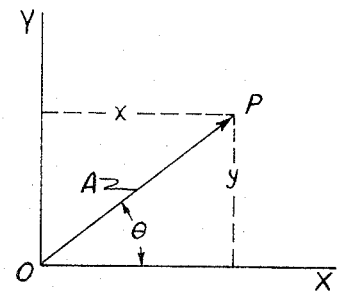
FIG. 1 is a vector diagram used in explaining the operation of the invention.

Referring to FIG. 1, point P is located on radius vector A which is drawn at an angle $\theta$ through the origin. The $x$ component of point P is equal to $A \cos \theta$, and the $y$ component is equal to $A \sin \theta$. The components are obtained as analogue values from a system, not shown, in which their values are always related by the expression $A = \sqrt{x^2 + y^2}$.

Figure 2:
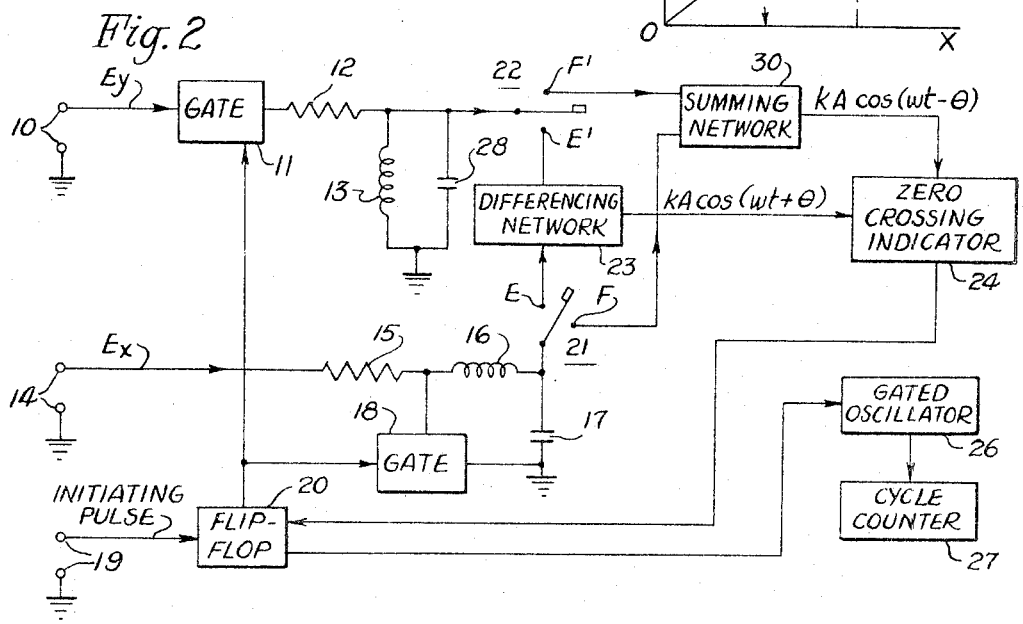
FIG. 2 is a first embodiment of the invention.

In FIG. 2, a signal dependent upon the value of the angle $\theta$ is obtained in three steps. First, waveform $k \sin \omega t$ is multiplied by a signal having a substantially constant magnitude proportional to $A \sin \theta$, and waveform $k \cos \omega t$ is multiplied by a signal having a substantially constant magnitude proportional to $A \cos \theta$. ($k$ and $\omega$ are chosen arbitrarily.) Next, the sum or difference of these products is obtained, the result being expressed by the trigonometrical equations:

$A \cos \theta \cos \omega t + kA \sin \theta \sin \omega t = kA \cos(\omega t - \theta)$ $A \cos \theta \cos \omega t - kA \sin \theta \sin \omega t = kA \cos(\omega t + \theta)$ Cos $(\omega t - \theta)$ and cos $(\omega t + \theta)$ are sinusoidal functions of $\omega t$, whose phase with respect to cos $\omega t$ varies directly with $\theta$. The third step, therefore, is to measure the difference in phase between $kA \cos(\omega t - \theta)$ or $kA \cos(\omega t + \theta)$ and $A \cos \omega t$. This measurement indicates the value of $\theta$.

Referring to FIG. 2, a substantially constant voltage $E_y$ having a magnitude proportional to $A \sin \theta$ is applied to terminals 10 so that current flows through normally-closed gate 11, resistor 12 and inductor 13 to ground. At the same time, a substantially constant voltage $E_x$ having a magnitude proportional to $A \cos \theta$, applied to terminals 14, causes current flow through resistor 15, inductor 16 and capacitor 17 to ground. Capacitor 17 is then charged to a voltage having a magnitude equal to that on terminals 14. $A \sin \theta$ and $A \cos \theta$ have magnitudes equal to the values of the orthogonal components of point P in FIG. 1.

At zero time $t_0$, a pulse, applied to terminals 19, operates flip-flop 20 to provide a signal that starts gated oscillator 26, opens gate 11 and closes normally-open gate 18. When gate 11 opens, the parallel circuit, comprising inductor 13 and capacitor 28, resonates, using the energy stored in the inductor. The sinusoidal voltage appearing across the capacitor has the waveform $kA \sin \theta \sin \omega t$, as shown in FIG. 3A, where $kA \sin \theta$ is the amplitude coefficient of sin $\omega t$.

When gate 18 closes, the parallel resonant circuit comprising inductor 16 and capacitor 17 is completed. Using the energy stored in capacitor 17, the circuit resonates, developing a voltage across the capacitor that has the waveform $kA \cos \theta \cos \omega t$, FIG. 3B, where $kA \cos \theta$ is the amplitude coefficient of cos $\omega t$.

If the arms of switches 21, 22 are in contact with terminals E, E', respectively, waveforms $kA \sin \theta \sin \omega t$ and $kA \cos \theta \cos \omega t$ are applied to differencing network 23 so that the output of the network has the waveform $kA \cos(\omega t + \theta)$, FIG. 3C.

The phase difference between waveforms $kA \cos(\omega t + \theta)$ and cos $\omega t$ is obtained by measuring the elapsed between the initiating pulse $t_0$ and the first zero crossing of $kA \cos(\omega t + \theta)$ of a chosen slope. Hence, the output of differencing network 23 is applied to zero-crossing indicator 24 which provides a pulse at time $t_s$, when cos $(\omega t + \theta)$ passes the zero axis from a negative to a positive polarity, as shown in FIG. 3C. The initiating pulse, as stated above, is applied at time $t_0$ to flip-flop 20 which generates a signal that initiates the operation of gated oscillator 26, and the pulse at time $t_s$ is applied to the flip-flop which then generates a signal that terminates the operation of the oscillator. Cycle counter 27, connected to the output of the oscillator, counts the number of cycles generated in the time interval between $t_0$ and $t_s$, FIG. 3D, which indicates the value of angle $\theta$. If, for example, the angular frequency of oscillator 26 is $N\omega$ and the count obtained is M, the value of the angle is $2\pi M/N$ radians or $360M/N$ degrees.

If the arms of switches 21, 22 are in contact with terminals F, F', respectively, waveforms $kA \sin \theta \sin \omega t$ and $kA \cos \theta \cos \omega t$ are applied to summing network 30. The output of the latter, having a waveform $kA \cos(\omega t - \theta)$, is applied to zero-crossing indicator 24 which applies a signal to flip-flop 20 at time $t_s$. Cycle counter 27 indicates the number of cycles occurring in the time interval between $t_0$ and $t_s$, thereby measuring the value of angle $\theta$, as described immediately above.

It is apparent that indicator 24, flip-flop 20, gated oscillator 26 and counter 27 cooperate to measure the phase difference between $kA \cos(\omega t + \theta)$ or $kA \cos(\omega t - \theta)$ and cos $\omega t$. Other arangements well known in the art could be used to make this measurement.

Figure 4:
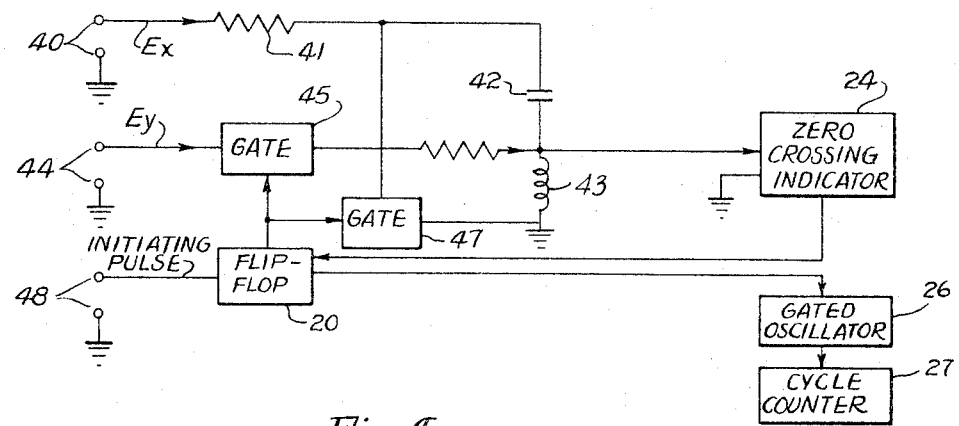
FIG. 4 is a second embodiment.

Referring to FIG. 4, a substantially constant voltage $E_x$ having a magnitude proportional to $A \cos \theta$ is applied to terminals 40 so that current flows through resistor 41, capacitor 42 and inductor 43 to ground, charging capacitor 42 to the voltage at terminals 40. $A \cos \theta$ has a value equal to the magnitude of the x component of point P in FIG. 1. Simultaneously, a constant voltage $E_y$ having a magnitude proportional to $A \sin \theta$, applied to terminals 44, causes current to flow through normally-closed gate 45, resistor 46 and inductor 43 to ground. $A \sin \theta$ has a value equal to magnitude of the y component of point P. At zero time $t_0$, an initiating pulse applied to terminals 48 operates flip-flop 20 which provides a signal that closes normally-open gate 47, opens gate 45 and starts operation of gated oscillator 26.

When gate 47 is closed, voltage $E_x$ is applied through resistor 41 and gate 47 to ground. The source, not shown, providing this voltage is not shorted to ground because of resistor 41. When gate 47 is closed, a parallel resonant circuit is completed that includes capacitor 42 and inductor 43. The energy stored in the capacitor and inductor force the resonant circuit to oscillate so that in effect $k \sin \omega t$ and $k \cos \omega t$ are multiplied by $A \sin \theta$ and $A \cos \theta$, respectively. The voltage developed across inductor 43 has the waveform $kA \sin(\omega t + \pi + \theta)$ and is applied to zero-crossing indicator 24.

As previously mentioned, at time $t_0$, flip-flop 20 provides a signal that initiates operation of gated oscillator 26; at time $t_s$, zero-crossing indicator 24 operates flip-flop 20 to provide a signal that terminates operation of oscillator 26. Counter 27 indicates the number of cycles occurring in the time interval between $t_0$ and $t_s$, which is a measure of the angle $\theta$, as described above in connection with FIG. 2.

Figure 5:
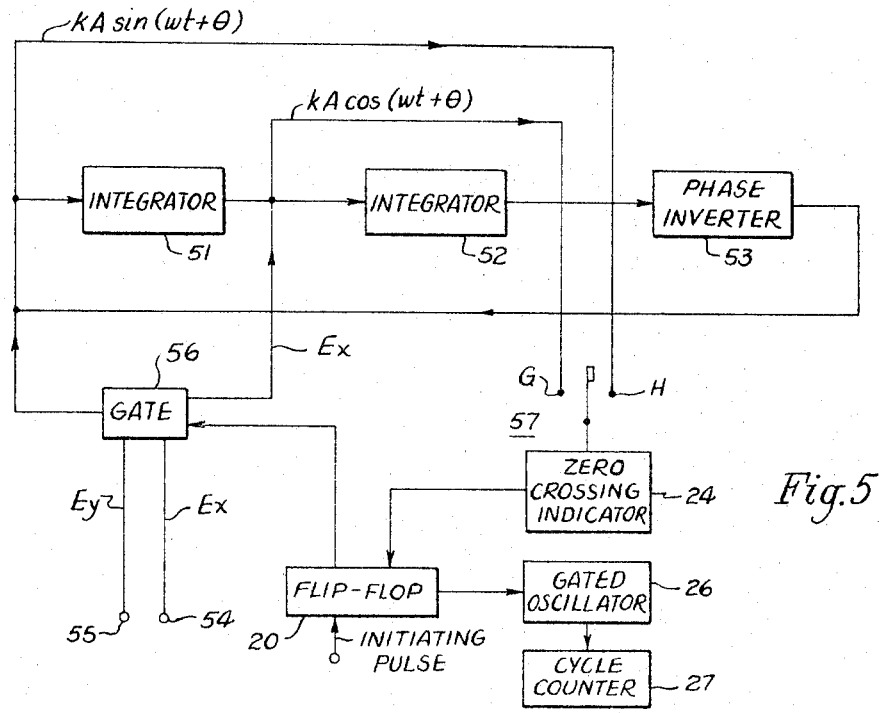
FIG. 5 is a third embodiment.

Referring to FIG. 5, integrators 51, 52 and phase inverter 53 are connected in a loop. A substantially constant voltage $E_x$ having a magnitude proportional to $A \cos \theta$ is applied to terminal 54, while a substantially constant voltage $E_y$ having a magnitude proportional to $A \sin \theta$ is applied to terminal 55. $A \cos \theta$ and $A \sin \theta$ have values equal to the magnitudes of the $x$ and $y$ components, respectively, of point P in FIG. 1. When an initiating pulse is applied at zero time $t_0$ to flip-flop 20, the latter generates a signal which closes normally-open gate 56. $A \sin \theta$ is then applied to the input and $A \cos \theta$ to the output of integrator 51.

When the arm of switch 57 is in contact with terminal G, waveform $kA \sin(\omega t + \theta)$ is applied to zero-crossing indicator 24; and when the arm is in contact with terminal H, waveform $kA \cos(\omega t + \theta)$ is applied to the indicator. As in the embodiments previously described, at time $t_0$, flip-flop 20 generates a signal to initiate operation of gated oscillator 26; at time $t_s$ indicator 24 controls the flip-flop to generate a signal to terminate operation of the oscillator. Counter 27, indicating the number of cycles that occur in the time interval between $t_0$ and $t_s$, measures the angle $\theta$, as described in connection with FIG. 2.

Figure 6:
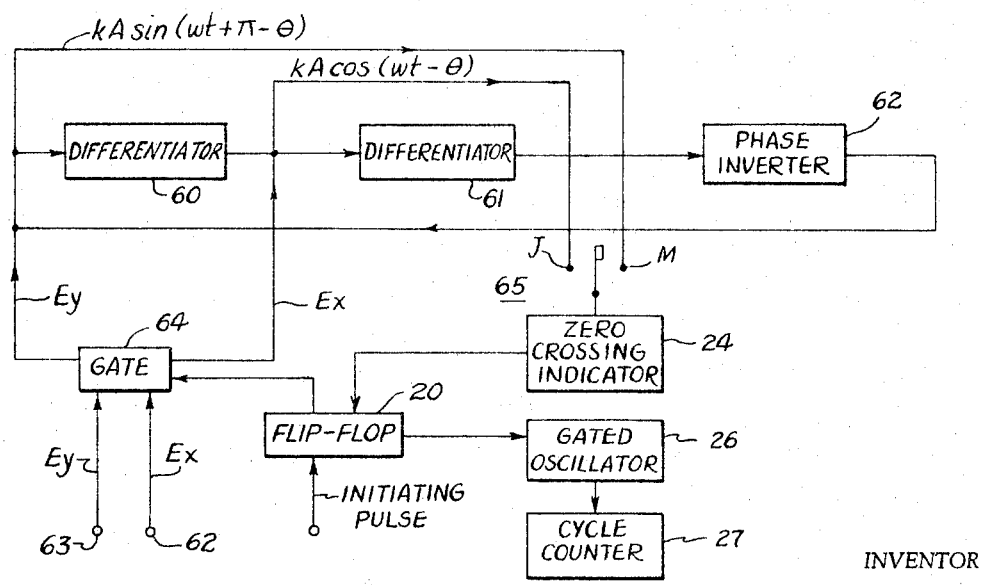
FIG. 6 is a fourth embodiment of the present invention.

Referring to FIG. 6, differentiators 60, 61 and phase inverter 62 are connected in a loop. Substantially constant voltages $E_x$ and $E_y$, having magnitudes proportional to $A \cos \theta$ and $A \sin \theta$, respectively, are applied to terminals 62, 63. $A \sin \theta$ and $A \cos \theta$ have values equal to those of the orthogonal components of point P in FIG. 1. At time $t_0$, an initiating pulse controls flip-flop 20 to provide a signal that closes normally-open gate 64. Voltage $E_y$ is then fed to the input and voltage $E_x$ to the output of differentiator 60. Simultaneously, the signal provided by the flip-flop is applied to gated oscillator 26, initiating operation of the oscillator.

When the arm of switch 65 is in contact with terminal J, wavefrom $kA \cos t (\omega t - \theta)$ is applied to indicator 24; when the arm is in contact with terminal M, wavefrom $kA \sin(\omega t + \pi - \theta)$ is applied to the indicator. At time $t_s$, indicator 24 feeds a pulse to flip-flop 20 to generate a signal that opens gate 64 and terminates operation of oscillator 26. As in the other embodiments, counter 27 indicates the number of cycles occurring in the time interval between $t_0$ and $t_s$, which is a measure of the angle $\theta$.

Obviously, many modifications and variations are possible in the light of the above teachings. For example, in FIG. 5 the signals applied to switch 57 could be derived from any one of several points in the loop comprising integrators 51, 52 and phase inverter 53, or voltage $E_x$ could be applied to the output and voltage $E_y$ to the input of integrator 51. In the latter case, the signals applied to switch 57 would have different waveforms than shown, but the results achieved would be essentially the same. It is therefore to be understood that within the scope of the appended claims, the invention may be practiced otherwise than as specifically described.

I claim:
1. In a device for measuring the angle of a radius vector, a first input terminal, a first parallel resonant circuit, a normally-closed gate connected between said first terminal and said first resonant circuit, a second parallel resonant circuit comprising an inductor, a capacitor and a normally-open gate connected in a loop, a second input terminal connected to said second resonant circuit, a differencing network connected between said first and second resonant circuit and phase measuring means connected to the output of said differencing network.

2. In a device for measuring the angle of a radius vector, a first input terminal, a first parallel resonant circuit, a normally-closed gate connected between said first terminal and said first resonant circuit, a second parallel resonant circuit comprising an inductor, a capacitor and a normally-open gate connected in a loop, a second input terminal connected to said second resonant circuit, a summing network connected between said first and second resonant circuit and phase measuring means connected to the output of said summing network.

3. In a device for measuring the angle of a radius vector, a first input terminal, a first parallel resonant circuit, a normally-closed gate connected between said first terminal and said first parallel resonant circuit, a second parallel resonant circuit comprising an inductor, a capacitor and a normally-open gate connected in a loop, a second input terminal connected to said second resonant circuit, a differencing network connected between said first and second resonant circuit, a zero-crossing indicator having an input connected to the output of said differencing network, a flip-flop circuit having an input connected to the output of said zero-crossing indicator, a third terminal connected to the input of said flip-flop circuit, a gated oscillator, means for applying the output of said flip-flop circuit to the said normally-open gate, said normally-closed gate and said oscillator, and a cycle counted connected to the output of said oscillator.

4. In a device for measuring the angle of a radius vector, a first input terminal, a first parallel resonant circuit, a normally-closed gate connected between said first input terminal and said first parallel resonant circuit, a second parallel resonant circuit comprising an inductor, a capacitor and a normally-open gate connected in a loop, a second input terminal connected to said second resonant circuit, a summing network connected between said first and second resonant circuit, a zero-crossing indicator having an input connected to the output of said summing network, a flip-flop circuit having an input connected to the output of said zero-crossing indicator, a third terminal connected to the input of said flip-flop circuit, a gated oscillator, means for applying the output of said flip-flop circuit to said normally-open gate, said normally-closed gate and said oscillator, and a cycle counter connected to the output of said oscillator.
fftcon

References Cited by the Examiner

UNITED STATES PATENTS

| 2,634,909 | 4/1953 | Lehmann | 235—61.5 |
| 2,812,435 | 11/1957 | Lyon | 324—83 |
| 2,926,852 | 3/1960 | Bennett | 235—189 |
| 2,939,081 | 5/1960 | Dennis | 328—122 |

OTHER REFERENCES

IBM Technical Disclosure Bulletin (Moore), vol. 3, No. 2, July 1960, page 35.

MALCOLM A. MORRISON, *Primary Examiner.*

DARYL W. COOK, *Examiner.*

K. W. DOBYNS, *Assistant Examiner.*